United States Patent
Chiang

(10) Patent No.: US 7,921,515 B2
(45) Date of Patent: Apr. 12, 2011

(54) HINGE AND COLLAPSIBLE DEVICE UTILIZING THE SAME

(75) Inventor: Chen-Wei Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 349 days.

(21) Appl. No.: 12/266,562

(22) Filed: Nov. 7, 2008

(65) Prior Publication Data

US 2010/0043176 A1   Feb. 25, 2010

(30) Foreign Application Priority Data

Aug. 20, 2008   (CN) .............................. 200810304112

(51) Int. Cl.
  *E05C 17/64*   (2006.01)
(52) U.S. Cl. ................. 16/340; 16/330; 16/337
(58) Field of Classification Search ............ 16/337–339, 16/342, 330, 303, 374, 376, 377, 340; 361/679.11, 361/679.12, 679.27; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS

| | | | | |
|---|---|---|---|---|
| 5,826,307 A * | 10/1998 | Chin-Fu | ......................... | 16/340 |
| 7,533,446 B1 * | 5/2009 | Lin | ................................ | 16/330 |
| 7,565,719 B2 * | 7/2009 | Su | ................................ | 16/337 |
| 2006/0200945 A1 * | 9/2006 | Lu et al. | ......................... | 16/340 |
| 2006/0272127 A1 * | 12/2006 | Chen | ............................. | 16/340 |
| 2007/0174996 A1 * | 8/2007 | Lu et al. | ......................... | 16/340 |
| 2007/0180656 A1 * | 8/2007 | Chen et al. | ..................... | 16/340 |
| 2007/0199179 A1 * | 8/2007 | Wang | ............................ | 16/340 |
| 2009/0193624 A1 * | 8/2009 | Sue et al. | ........................ | 16/386 |
| 2009/0205170 A1 * | 8/2009 | Lin | ................................ | 16/337 |

FOREIGN PATENT DOCUMENTS

CN   2913717 Y   6/2007
CN   201078397 Y   6/2008

* cited by examiner

*Primary Examiner* — Chuck Y. Mah
(74) *Attorney, Agent, or Firm* — Zhigang Ma

(57) ABSTRACT

A hinge includes a first connecting member, a shaft, a second connecting member, a first fixing member rotatably mounted to the shaft, a ring immovable fixed to the shaft and abutting against the first fixing member, a number of biasing members all rotationally mounted to the shaft, and a fastener. The shaft extends from the first connecting member, with a threaded distal end of the shaft engaging with the fastener. The second connecting member defines a first depressed portion, a through hole transversely passing through the first depressed portion for rotationally fitting about the shaft, and a fixing slot in a first end of the second connecting member. The first fixing member is received in the first depressed portion, and a fixing protrusion extends from the first fixing member for engaging with the fixing slot.

20 Claims, 6 Drawing Sheets

HINGE AND COLLAPSIBLE DEVICE UTILIZING THE SAME

BACKGROUND

1. Technical Field

The present disclosure relates to hinges and collapsible devices utilizing the hinges and, particularly, to a hinge and a collapsible device utilizing the same.

2. Description of Related Art

A collapsible device, such as a notebook computer, or a clamshell mobile phone, generally including a main body and a display, often uses a hinge to interconnect the main body and the display. The hinge allows the display to be rotational with respect to the main body, and to be folded with the main body for saving space.

A hinge normally includes two pieces fixed to the main body and the display of the collapsible device, respectively. The pieces are rotational relative to, and in friction engagement with, each other. During rotation, the display can maintain at any angle with respect to the main body by friction between the pieces. However, the pieces are not durable. After frequent usage and due to wear and tear, the pieces could no longer fit together tightly, thereby preventing the display from being able to stay at certain desirable positions. Even worse, when one of the pieces is worn out, the display cannot maintain stability at almost any angle with respect to the main body, which creates a quite inconvenience for users.

DETAILED DESCRIPTION

Figure 1:
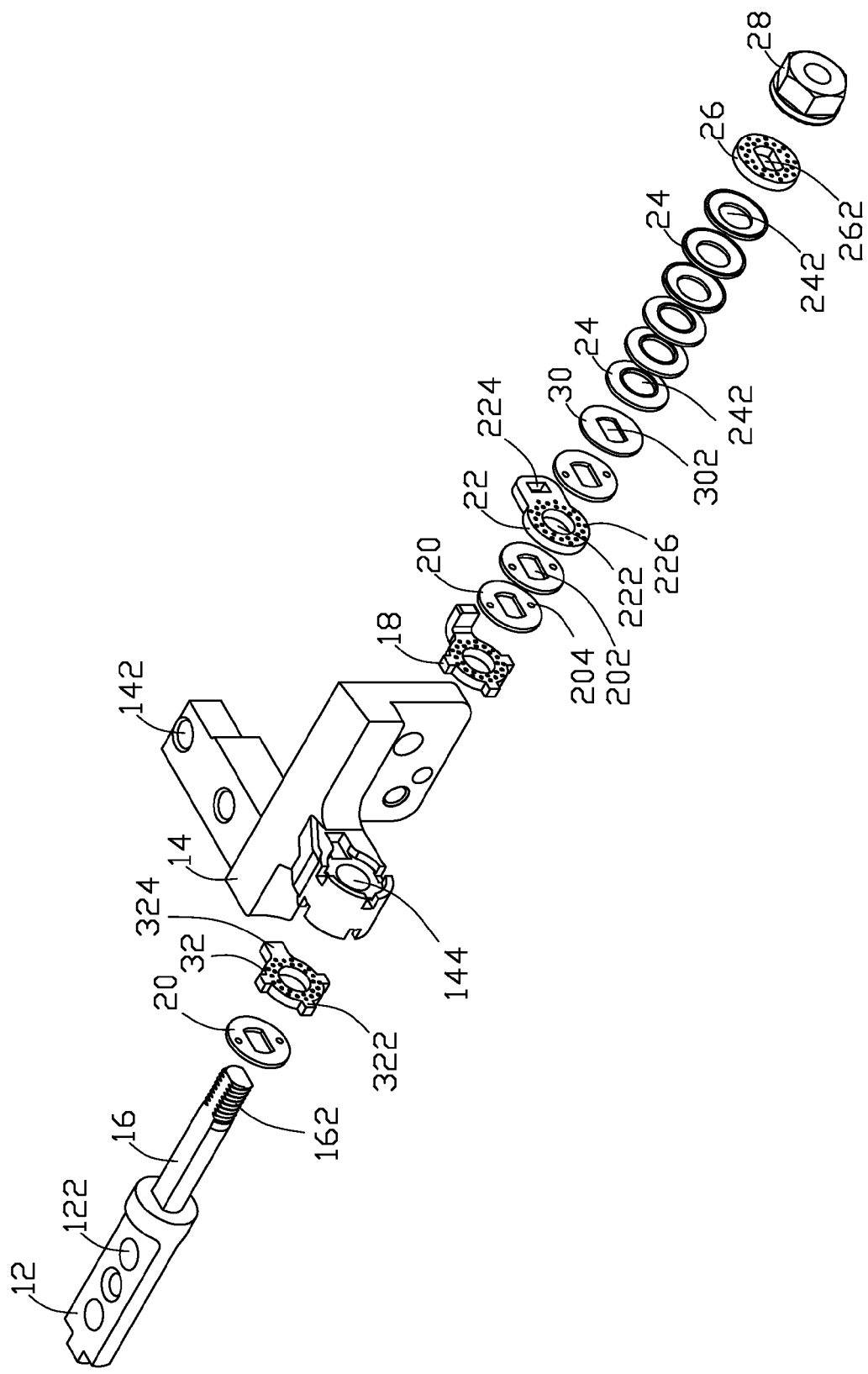
FIG. 1 is an exploded, isometric view of an exemplary embodiment of a hinge including a first fixing member, a second fixing member, and a connecting member.

Referring to FIG. 1, an exemplary embodiment of a hinge includes a first connecting member 12, a shaft 16, a second connecting member 14, a first fixing member 18, a second fixing member 32, a plurality of rings 20, a friction member 22, a washer 30, a plurality of biasing members 24, a fixing member 26, and a fastener 28.

The first connecting member 12 defines a plurality of fixing holes 122 therein. The shaft 16 extends from an end of the first connecting member 12. A distal end of the shaft 16 is double-D shaped, and forms a threaded portion 162 thereon.

Figure 2:
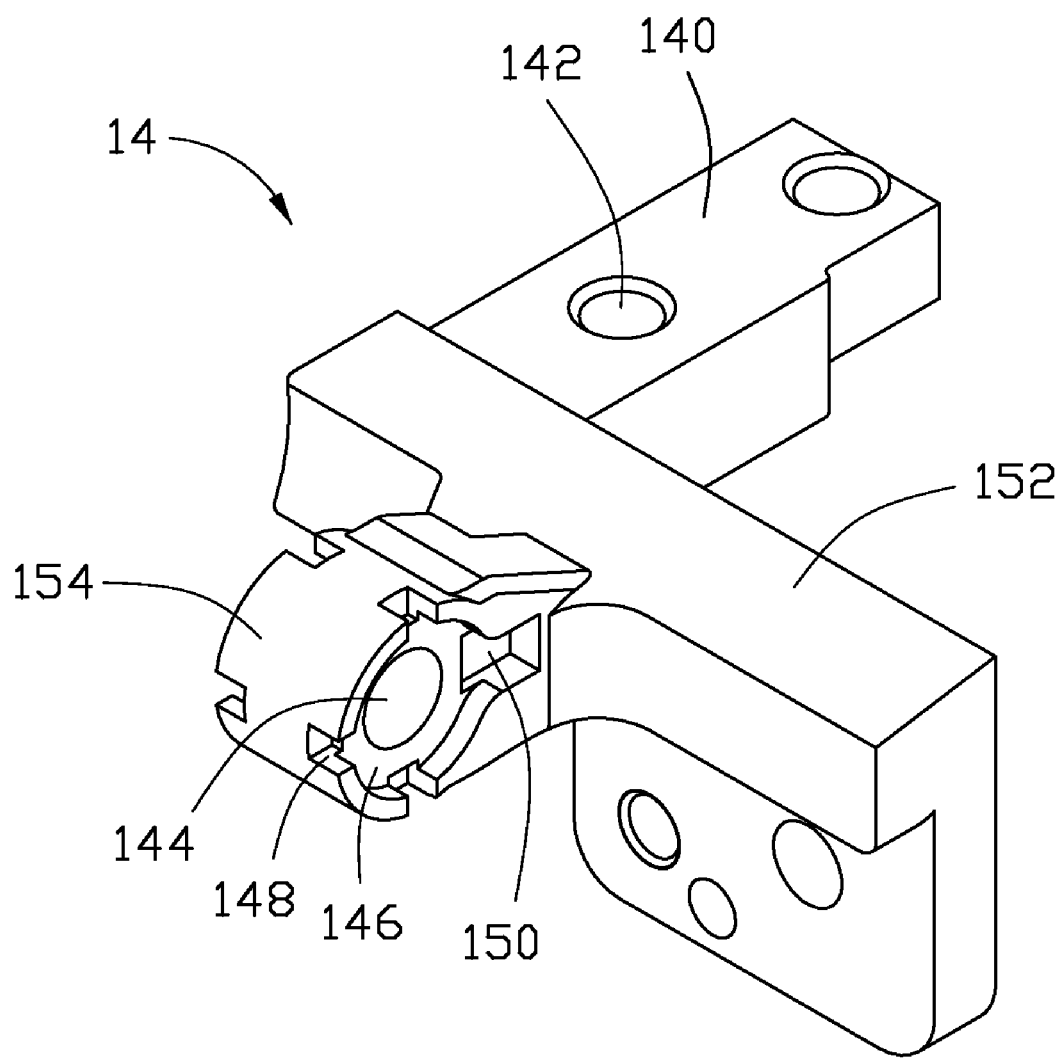
FIG. 2 is an enlarged, isometric view of the connecting member of FIG. 1.

Referring to FIG. 2, the second connecting member 14 includes a connecting portion 152, a fixing portion 140 extending from a first side surface of the connecting portion 152, and a cylindrical sleeve 154 extending from a second side surface of the connecting portion 152 and opposite to the fixing hole 142. The fixing portion 140 defines a plurality of fixing holes 142 therein. The sleeve 154 longitudinally defines a through hole 144 for the shaft 16 passing through. Two depressed portions 146 surrounding the through hole 144 are correspondingly defined in opposite end surfaces of the sleeve 154. The depressed portions 146 are configured for receiving the corresponding fixing members 18 and 32, respectively. Depths of the depressed portions 146 are substantially equal to heights of the corresponding fixing members 18 and 32. In other embodiments, the depths of the depressed portions 146 may be a little deeper than the heights of the corresponding fixing members 18 and 32. A plurality of first fixing slots 148 are defined in opposite ends of a circumference of the sleeve 154, communicating with the corresponding depressed portions 146. A second fixing slot 150 is defined in each end surface of the sleeve 154, adjacent to the connecting portion 152 and communicating with the corresponding depressed portion 146.

Figure 3:
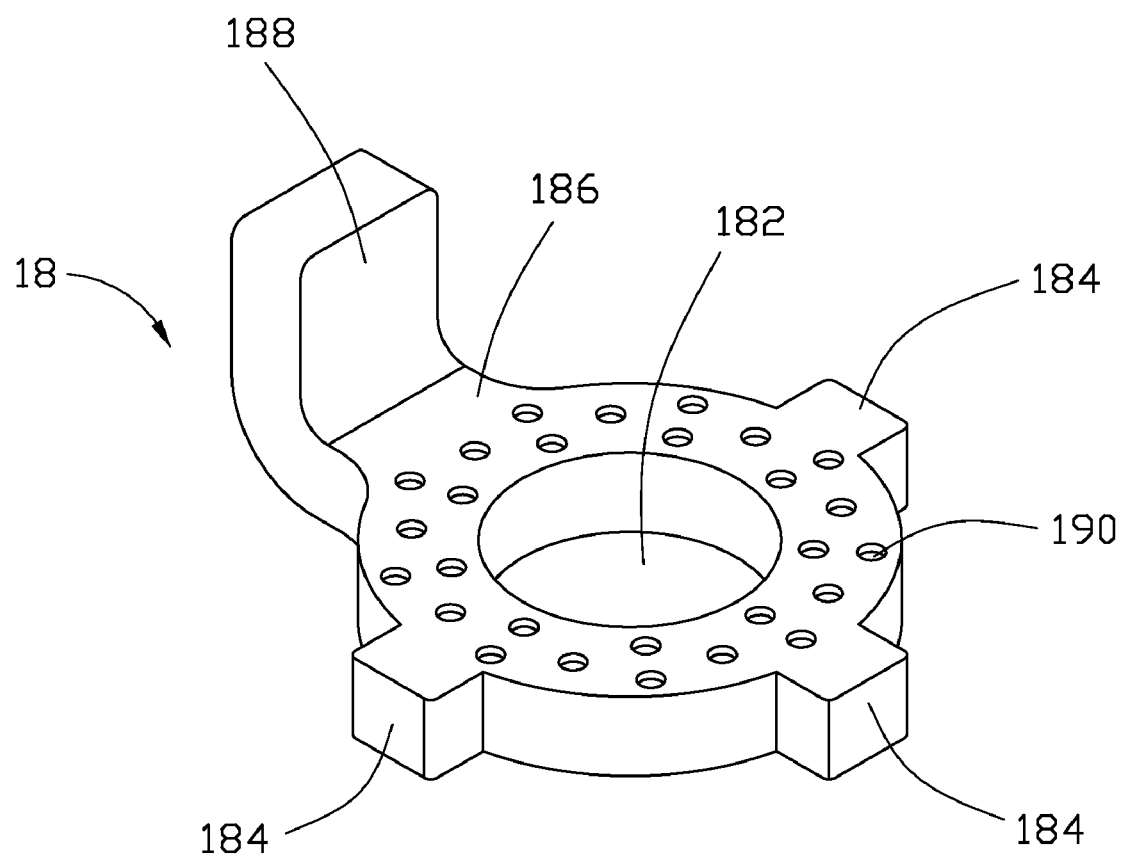
FIG. 3 is an enlarged, isometric view of the first fixing member of FIG. 1, but viewed from another perspective.

Referring to FIG. 3, the first fixing member 18 has a shape similar to the corresponding depressed portion 146, and defines a round shaft hole 182 for allowing the shaft 16 to be passable through. A plurality of first fixing protrusions 184 and a second fixing protrusion 186 radially extend from a circumference of the first fixing member 18, so as to be engaged in the first fixing slots 148 and the second fixing slot 150, correspondingly. In one embodiment, the first fixing member 18 can only defines one first fixing protrusion 184. A tab 188 extends axially parallel to the shaft hole 182 from a distal end of the second fixing protrusion 186. The first fixing member 18 further defines a plurality of recessed portions 190 around the shaft hole 182, capable of retaining lubricants.

Referring again to FIG. 1, the second fixing member 32 is similar to the first fixing member 18. The second fixing member 32 also defines a round shaft hole (not labeled) for allowing the shaft 16 to be passable through, and includes a plurality of first fixing protrusions 322 and a second fixing protrusion 324.

Each ring 20 defines a double-D shaped through hole 202 for engaging the shaft 16. The shape of the double-D shaped through hole 202 corresponds to the cross-section of the double-D shaped shaft 16, and thus, each ring 20 and the shaft 16 are non-rotatable relative to each other. As illustrated, the rings 20 each also defines at least one recessed portions 204 for retaining lubricants, so as to reduce friction.

The friction member 22 defines a round through hole 222 and a fixing hole 224 adjacent to the through hole 222. The through hole 222 is configured for allowing the shaft 16 to be passable through, thereby, allowing the shaft 16 to rotate freely relative to the friction member 22. In the illustrated embodiment, the friction member 22 defines a plurality of recessed portions 226 around the through hole 222, capable of retaining lubricants to result in reducing friction.

Each biasing member 24 is configured to provide elastic forces along an axial direction to tighten the rings 20, the friction member 22, the first fixing member 18, and the second connecting member 14. The biasing member 24 defines a round through hole 242 for allowing the shaft 16 to be passable through, thereby, allowing the shaft 16 to rotate freely relative to the biasing member 24.

The fixing member 26 defines a double-D shaped through hole 262 for engaging the shaft 16, and thus, the fixing member 26 can be driven to rotate, following the shaft 16.

The washer 30 defines a double-D shaped through hole 302 in a center thereof for non-rotationally fitting about the shaft 16.

Figure 4:
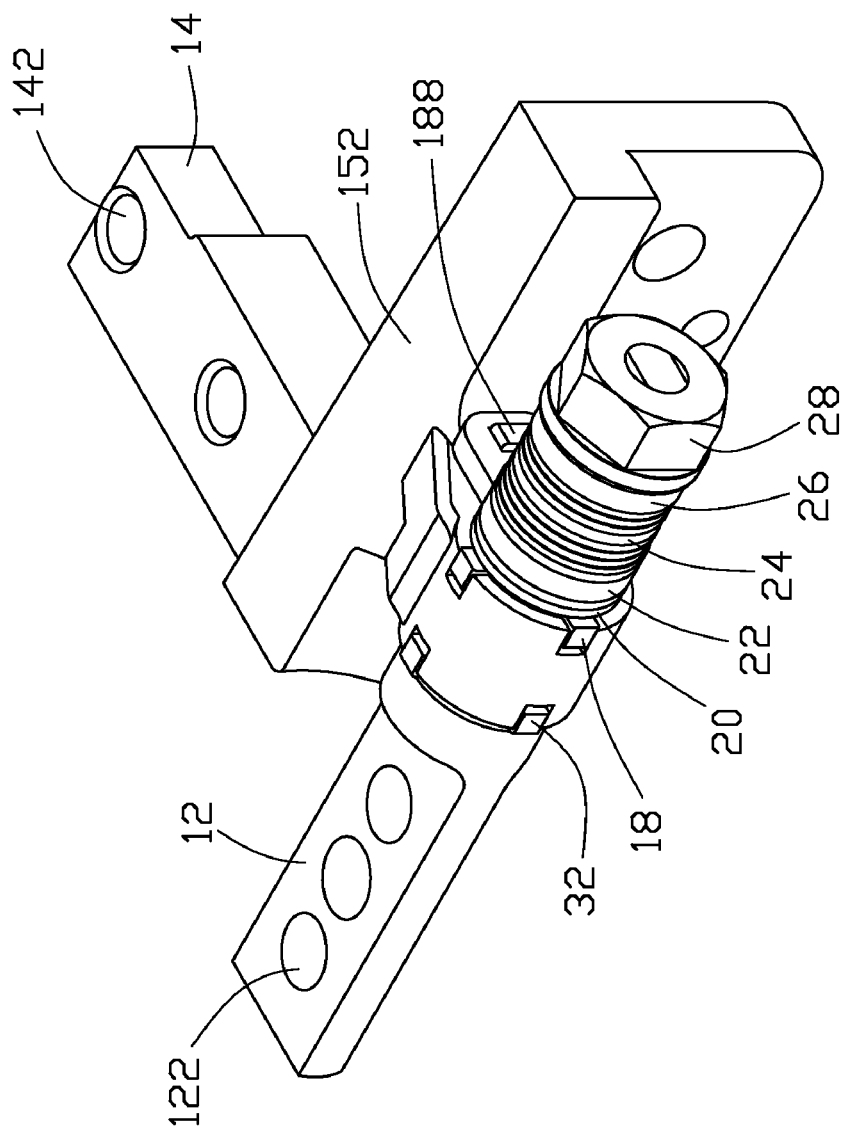
FIG. 4 is an assembled, isometric view of FIG. 1.

Referring to FIG. 4, in assembly, the shaft 16 with the threaded portion 162 is passed through the through hole 202 of one of the rings 20, the shaft hole of the second fixing member 32, the through hole 144 of the second connecting member 14, the shaft hole 182 of the first fixing member 18, the through holes 202 of some rings 20, the through hole 222 of the friction member 22, the through hole 202 of one of the rings 20, the through hole 302 of the washer 30, the through holes 242 of the biasing members 24, and the through hole 262 of the fixing member 26 in turn. The fastener 28 is engaged with the threaded portion 162 for fixing the fastener 28 to the shaft 16, which is configured for preventing the fixing member 26, the biasing members 24, the washer 30, the friction member 22, the rings 20, the first fixing member 18, the second fixing member 32, and the second connecting member 14 from disengaging from the shaft 16.

In the aforementioned assembly, the first and second fixing members 18 and 32 are received in the corresponding depressed portions 146. As a result, the first fixing protrusions 184 are engaged in the corresponding first fixing slots 148, and the second fixing protrusion 186 is engaged in the corresponding second fixing slot 150. Therefore, the first fixing member 18 is fixed to and rotatably driven by the second connecting member 14. Correspondingly, the second fixing member 32 is fixed to and rotatably driven by the second connecting member 14. The tab 188 is inserted into the fixing hole 224, thereby fixing the friction member 22 to the first fixing member 18. Accordingly, the first fixing member 18 is rotatably driven by the second connecting member 14. One of the rings 20 is mounted between the first connecting member 12 and the second fixing member 32, and other rings 20 are positioned beside the friction member 22. All the rings 20 are immovably fitted about and rotated with the shaft 16. Accordingly, the rings 20 correspondingly provides friction with the second fixing member 32, the first second member 18, and the friction member 22 during rotation of the shaft 16 relative to the second connecting member 14.

Figure 5:
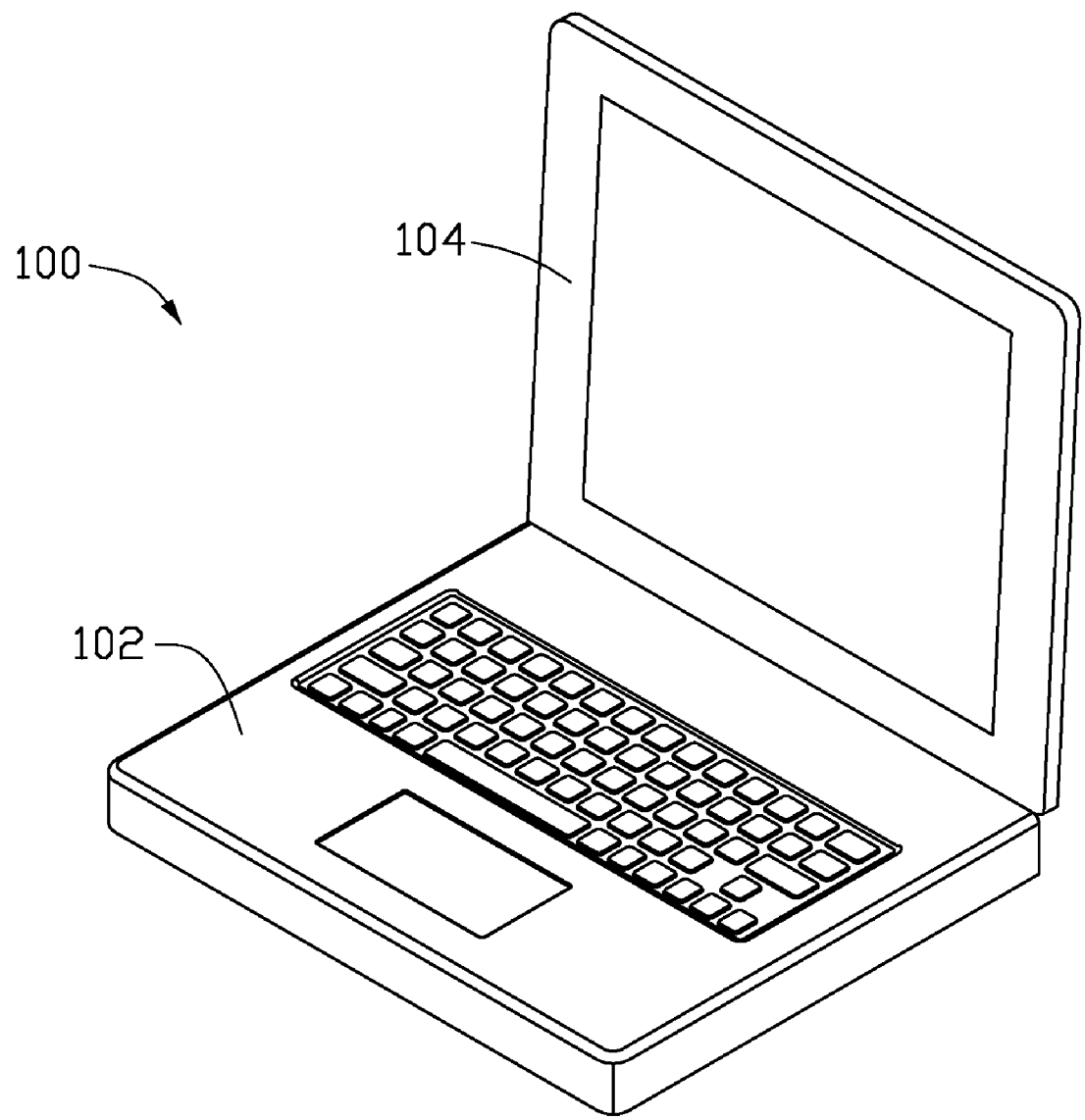
FIG. 5 is an isometric view of an exemplary embodiment of a collapsible device utilizing the hinge of FIG. 1.

Referring to FIG. 5, in use, the above-mentioned hinge is utilized in a collapsible device 100, here for instance, in a notebook computer that includes a base 102 and a cover 104. The fixing holes 122 are configured for allowing fastening members, such as screws, bolts, rivets, etc., to extend through, thereby fixing the first connecting member 12 to one of the cover 104 and the base 102. Similarly, the fixing holes 142 are configured for allowing fastening members, such as screws, bolts, rivets, etc., to extend through, thereby fixing the second connecting member 14 to the other one of the cover 104 and the base 102. Therefore, during the rotation of the cover 104, the second connecting member 14 is rotated relative to the first connecting member 12, together with the first and second fixing members 18 and 32, the friction member 22, and the biasing members 24. As a result, friction among the rings 20, the friction member 22, the first fixing member 18, and the second fixing member 32 positions the cover 104 maintaining stability at any angle with respect to the base 102.

Figure 6:
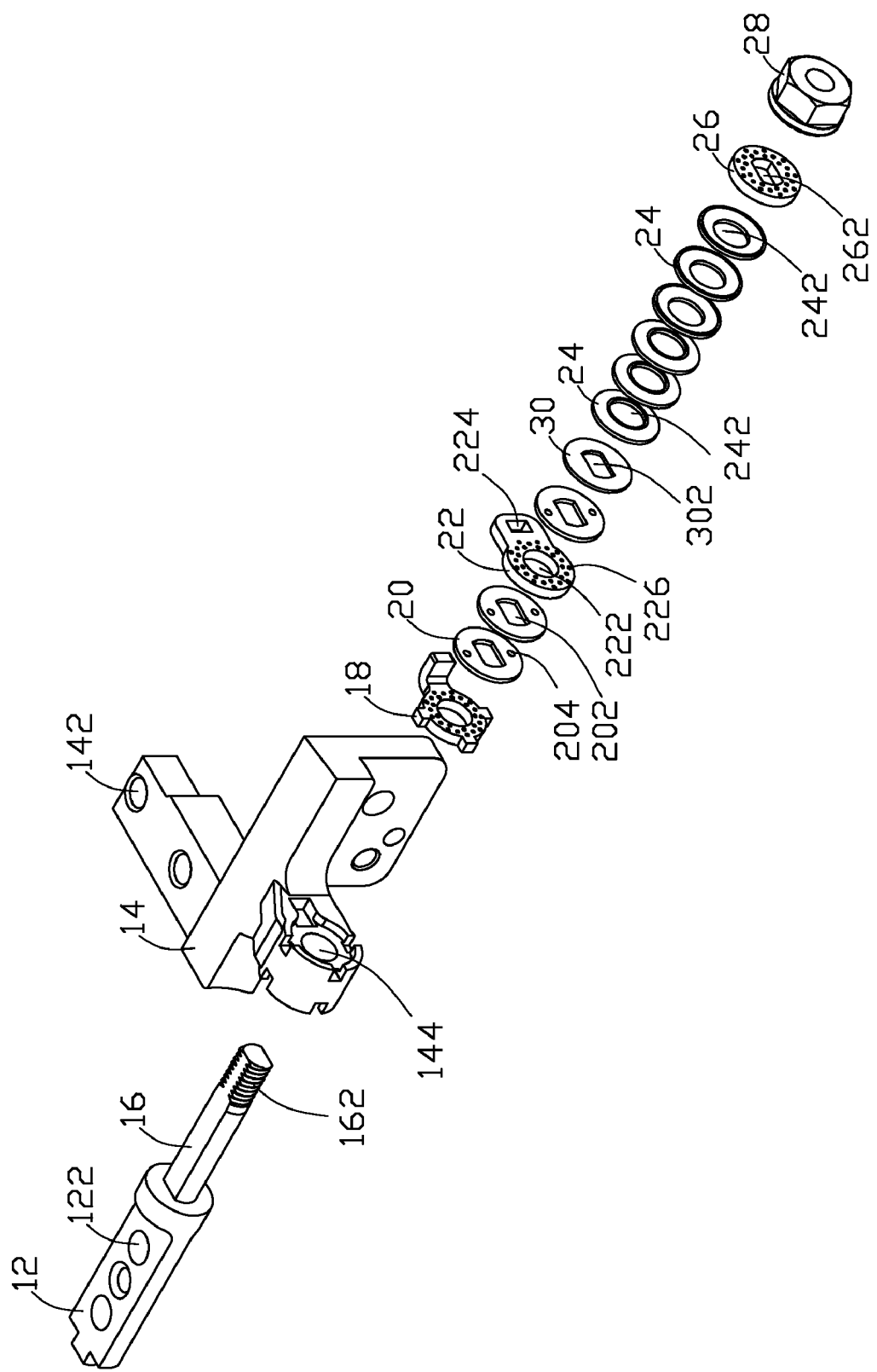
FIG. 6 is an exploded, isometric view of an alternative exemplary embodiment of a hinge, similarly applicable for being utilized in the collapsible device of FIG. 5.

In other embodiments, to obtain different friction, the number of the first fixing member 18, the rings 20 abutting against the friction member 22, and the friction member 22 can be adjusted according to the need. Correspondingly, the number of the second fixing member 32, and the rings 20 abutting against the second fixing member 32 can also be adjusted. In addition, the recessed portions 190, 204 and 226 capable of retaining lubricants can adjust the friction. Referring to FIG. 6, an alternative exemplary embodiment of a hinge is similar to the above-mentioned exemplary embodiment, but does not includes the second fixing member 32, and the ring 20 abutting against the second fixing member 32.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A hinge comprising:
   a first connecting member;
   a shaft extending from the first connecting member, a distal end of the shaft defining a threaded portion;
   a second connecting member defining a first depressed portion, a through hole transversely passing through the first depressed portion for rotationally fitting about the shaft, and at least one fixing slot in a first end surface of the second connecting member;
   a first fixing member rotatably mounted to the shaft, wherein the first fixing member is received in the first depressed portion, and comprises at least one fixing protrusion engaged with the at least one fixing slot;
   at least one ring immovably fixed to the shaft and abutting against the first fixing member;
   a plurality of biasing members all rotationally mounted to the shaft; and
   a fastener engaged with the threaded portion;
   wherein the second connecting member, the first fixing member, the at least one ring, and the plurality of biasing members are mounted to the shaft and positioned between the first connecting member and the fastener.

2. The hinge of claim 1, further comprising a friction member fixed to the first fixing member, wherein the friction member is rotatably mounted to the shaft, the at least one ring is sandwiched between the first fixing member and the friction member.

3. The hinge of claim 2, wherein the friction member defines at least one fixing hole, at least one tab axially extends from the first fixing member for being engaged in the at least one fixing hole.

4. The hinge of claim 1, wherein the first depressed portion is positioned in a first end surface of the second connecting member and surrounding the through hole.

5. The hinge of claim 1, wherein the at least one fixing slot communicates with the first depressed portion.

6. The hinge of claim 1, wherein the second connecting member comprises a connecting portion and a sleeve connected to the connecting portion, the through hole is defined in the sleeve and longitudinally passed through the sleeve, the at least one fixing slot is defined in a circumference of the sleeve.

7. The hinge of claim 6, wherein the at least one fixing slot comprises a plurality of first fixing slots and a second fixing slot, the at least one fixing protrusion comprises a plurality of first fixing protrusions and a second fixing protrusion, the plurality of first fixing protrusions are engaged with the plurality of first fixing slots, respectively, the second fixing protrusion is engaged in the second fixing slot.

8. The hinge of claim 1, wherein a depth of the first depressed portion is substantially equal to a height of the first fixing member.

9. The hinge of claim 1, wherein a depth of the first depressed portion is deeper than a height of the first fixing member.

10. The hinge of claim 1, further comprising a second fixing member, wherein the second connecting member further defines a second depressed portion opposite to the first depressed portion, the second fixing member is received in the second depressed portion, at least one fixing slot is defined in a circumference of the second connecting member, communicating with the second depressed portion, at least one fixing protrusion extends from the second fixing member for engaging with the corresponding at least one fixing slot.

11. A collapsible device comprising:
    a base;

a hinge comprising:
    a first connecting member;
    a shaft extending from the first connecting member, a distal end of the shaft defining a threaded portion;
    a second connecting member defining a first depressed portion, a through hole transversely passing through the first depressed portion for rotationally fitting about the shaft, and at least one fixing slot in a first end of the second connecting member;
    a first fixing member rotatably mounted to the shaft, wherein the first fixing member is received in the first depressed portion, and comprises at least one fixing protrusion engaged with the at least one fixing slot;
    at least one ring immovably fixed to the shaft and abutting against the first fixing member;
    a plurality of biasing members all rotationally mounted to the shaft; and
    a fastener engaged with the threaded portion; and
a cover pivotally mounted to the base via the hinge;
wherein the first connecting member is fixed to one of the cover and the base, and the second connecting member is fixed to the other one of the cover and the base, the second connecting member, the first fixing member, the at least one ring, and the biasing members are mounted to the shaft and positioned between the first connecting member and the fastener.

12. The collapsible device of claim 11, wherein the hinge further comprises a friction member fixed to the first fixing member, the friction member is rotatably mounted to the shaft, the at least one ring is sandwiched between the first fixing member and the friction member.

13. The collapsible device of claim 12, wherein the friction member defines at least one fixing hole, at least one tab axially extends from the first fixing member for engaged in the at least one fixing hole.

14. The collapsible device of claim 11, wherein the first depressed portion is positioned in a first end surface of the second connecting member and surrounding the through hole.

15. The collapsible device of claim 11, wherein the at least one fixing slot communicates with the first depressed portion.

16. The collapsible device of claim 11, the second connecting member comprises a connecting portion and a sleeve connected to the connecting portion, the through hole is defined in the sleeve and longitudinally passed through the sleeve, the at least one fixing slot is defined in a circumference of the sleeve.

17. The collapsible device of claim 16, wherein the at least one fixing slot comprises a plurality of first fixing slots and a second fixing slot, the at least one fixing protrusion comprises a plurality of first fixing protrusions and a second fixing protrusion, the plurality of first fixing protrusions are engaged with the plurality of first fixing slots, respectively, the second fixing protrusion is engaged in the second fixing slot.

18. The collapsible device of claim 11, wherein a depth of the first depressed portion is substantially equal to a height of the first fixing member.

19. The collapsible device of claim 11, wherein a depth of the first depressed portion is deeper than a height of the first fixing member.

20. The collapsible device of claim 11, further comprising a second fixing member, wherein the second connecting member further defines a second depressed portion opposite to the first depressed portion, and the second fixing member is received in the second depressed portion, at least one fixing slot is defined in a circumference of the second connecting member, communicating with the second depressed portion, at least one fixing protrusion extends from the second fixing member for engaging with the corresponding at least one fixing slot fixing slot.

* * * * *